(12) United States Patent
Jung et al.

(10) Patent No.: US 9,650,721 B2
(45) Date of Patent: May 16, 2017

(54) HIGHLY EFFICIENT SODIUM HYPOCHLORITE GENERATION APPARATUS CAPABLE OF DECREASING DISINFECTION BY-PRODUCTS

(71) Applicants: TECHWIN CO., LTD., Cheongju (KR); KOREA WATER RESOURCES CORPORATION, Daejeon (KR)

(72) Inventors: Boong Ik Jung, Cheongju (KR); Jung Sik Kim, Cheongju (KR); Hyun Su Shin, Daejeon (KR); Sang Seek Bae, Seoul (KR); Kyong Lee, Daejeon (KR); Young Jae Lee, Daejeon (KR)

(73) Assignees: TECHWIN CO., LTD., Cheongju (KR); KOREA WATER RESOURCES CORPORATION, Daejoen (KR)

( * ) Notice: Subject to any disclaimer, the term of this patent is extended or adjusted under 35 U.S.C. 154(b) by 315 days.

(21) Appl. No.: 14/362,577

(22) PCT Filed: Nov. 28, 2012

(86) PCT No.: PCT/KR2012/010172
§ 371 (c)(1),
(2) Date: Jun. 3, 2014

(87) PCT Pub. No.: WO2013/089366
PCT Pub. Date: Jun. 20, 2013

(65) Prior Publication Data
US 2014/0311897 A1 Oct. 23, 2014

(30) Foreign Application Priority Data

Dec. 14, 2011 (KR) .................. 10-2011-0134297

(51) Int. Cl.
*C25B 9/10* (2006.01)
*C25B 1/26* (2006.01)
(Continued)

(52) U.S. Cl.
CPC .............. *C25B 9/10* (2013.01); *C02F 1/4674* (2013.01); *C02F 1/4693* (2013.01); *C25B 1/26* (2013.01);
(Continued)

(58) Field of Classification Search
CPC .... C25B 1/26; C25B 1/34; C25B 1/46; C25B 9/08; C25B 9/10; C25B 15/08;
(Continued)

(56) References Cited

U.S. PATENT DOCUMENTS 3,899,403 A * 8/1975 Cook, Jr. ................ C25B 13/02
205/345

FOREIGN PATENT DOCUMENTS

JP    2002-153874 A    5/2002
JP    2009-006287 A    1/2009
(Continued)

*Primary Examiner* — Ciel Thomas
(74) *Attorney, Agent, or Firm* — KORUS Patent, LLC; Seong Il Jeong

(57) ABSTRACT

The present invention relates to a highly efficient sodium hypochlorite generation apparatus capable of decreasing disinfection by-products, which is a chlorine disinfection device for on-site generation and produces sodium hypochlorite solution by electrolyzing sodium chloride aqueous solution on site, thereby requiring no additional liquefied chlorine storage equipment or disaster prevention equipment and securing flexibility of installation and operation while not being regulated by a high-pressure gas safety control act.

The highly efficient sodium hypochlorite generation apparatus of the present invention capable of decreasing disinfection by-products comprises: a diaphragm electrolytic bath comprising an anode room into which a sodium chloride aqueous solution flows, a cathode room into which water flows, and a cation exchange membrane for dividing
(Continued)

the anode room and the cathode room; an anode water storage tank for storing chlorine gas and anode water generated by the electrolysis of the anode room; a cathode water storage tank for storing sodium hydroxide generated by the electrolysis of the cathode room and discharging hydrogen gas; and a gas/liquid contact portion in which the chlorine gas supplied from the anode water storage tank reacts with the sodium hydroxide generated at the cathode water storage tank to produce sodium hypochlorite, wherein the sodium hypochlorite generation apparatus further comprises a water-splitting electrodialysis tank for producing hydrochloric acid and sodium hydroxide using a sodium chloride aqueous solution and water to supply the same as anode water and cathode water, respectively.

The present invention can provide a highly efficient sodium hypochlorite generation apparatus capable of decreasing disinfection by-products which can minimize the generation of chlorate ions ($ClO_3-$), by-products, by increasing the chlorine generation efficiency of an anode and adjusting a material balance in case of gas/liquid contact. In addition, since it is possible to provide chemicals generated using salt only to a diaphragm sodium hypochlorite generation apparatus, a highly efficient sodium hypochlorite generation apparatus capable of decreasing disinfection by-products with excellent safety and economic efficiency can be provided without using expensive chemicals that are difficult to handle.

7 Claims, 4 Drawing Sheets

(51) Int. Cl.
*C02F 1/461* (2006.01)
*C02F 1/467* (2006.01)
*C02F 1/469* (2006.01)
*C25B 15/08* (2006.01)

(52) U.S. Cl.
CPC .... *C25B 15/08* (2013.01); *C02F 2201/46115* (2013.01)

(58) Field of Classification Search
CPC .... C02F 1/4602; C02F 1/4674; C02F 1/4693; C02F 2201/46115
See application file for complete search history.

(56) References Cited

FOREIGN PATENT DOCUMENTS

| KR | 10-0902537 B1 | 6/2009 |
|---|---|---|
| KR | 10-2011-0088671 A | 8/2011 |
| KR | 10-1079470 B1 | 11/2011 |

* cited by examiner

HIGHLY EFFICIENT SODIUM HYPOCHLORITE GENERATION APPARATUS CAPABLE OF DECREASING DISINFECTION BY-PRODUCTS

TECHNICAL FIELD

The present invention relates to a sodium hypochlorite generator which is used in water treatment processes; more specifically a high efficiency sodium hypochlorite generator for decreasing by-product which is a on-site chlorine disinfection device that can secure the flexibility of the installation and operation, that is not subject to the regulation of high-pressure gas safety laws, and that does not require a separate liquid chlorine storage facilities or disaster prevention facilities, by producing subchloride solution by the on-site the electrolysis of brine solution.

BACKGROUND ART

Putting chlorine in water treatment plant is essential for the control and suppression of microbial organisms.

However, existing gaseous chlorine is lethal toxicity and safety issues, so existing chlorination facilities are being replaced quickly by the system of electrolyzing the brine, followed by dosing sodium hypochlorite.

In a conventional general diaphragm-type sodium hypochlorite generators, the membrane electrolyzer is composed of the anode chamber 12 and a cathode chamber 14 divided by the cation exchange membrane 16 as shown in FIG. 1 and FIG. 2; the anode chamber 12 has the anode and the cathode chamber 14 has the cathode. And the node chamber 12 and the cathode chamber 14 are connected to the anode storage tank 20 and cathode storage tank 30, respectively.

The cathode chamber 12 has circulating saturated sodium chloride aqueous solution that was introduced into the anode storage tank 20, and the cathode chamber 14 has circulating pure water that has flowed into the cathode storage tank 30. And the electrolytic reaction is taking place inside the membrane electrolyzer when direct current is supplied to the anode and cathode when the anode and cathode liquids flows in and circulates the membrane electrolyzer.

Chlorine ($Cl_2$) is formed through the electrolytic reaction of chlorine ion (Cl−) in the anode, and the sodium ion (Na+) is passed from the anode chamber 12 to the cathode chamber 14 through the cation exchange membrane 16. And hydrogen gas ($H_2$) and hydroxide ion (OH−) are formed by the electrolysis reaction of the water ($H_2O$) in the cathode; hydroxide ions (OH−) combined with sodium ions (Na+) from the anode to form caustic soda (NaOH).

$$2Cl^- \rightarrow Cl_2 + 2e^- \text{ (anodic reaction)}$$

$$H_2O + 2e^- \rightarrow \tfrac{1}{2}H_2 + OH^- \text{ (cathodic reaction)}$$

Thus formed chlorine gas (Cl2) in the anode chamber reacts with caustic soda (NaOH) generated in the cathode chamber to form sodium hypochlorite (NaOCl) in the gas-liquid contact area 40.

$$Cl_2 + 2NaOH \rightarrow NaOCl + NaCl + H_2O \text{ (gas-liquid reaction)}$$

However, in such diaphragm-type sodium hypochlorite generator, oxygen ($O_2$) and hydrogen ions (H+) are generated by the side reaction of the electrolytic reaction in the anode and meet with chlorine ions (Cl−) existing in sodium chloride solution to form hydrochloric acid (HCl), resulting in reduced pH. And in the cathode, the caustic soda (NaOH) is generated as stated above and the pH is increased.

$$H_2O \rightarrow 2H^+ + \tfrac{1}{2}O_2 + 2e^- \text{ (anodic side reaction)}$$

Accordingly, if the side reactions are reduced and the current efficiency for chlorine is increased, the pH is relatively reduced and the amount of chlorine is increased. However, if the current efficiency for chlorine is increased, the amount of the chlorine gas ($Cl_2$) transferring to the gas-liquid contact area 40 is reduced, resulting in the decreased efficiency because some part of the chlorine is dissolved in the anode water in the form of hypochlorite (HOCl) (for pH=1, $Cl_2$:HOCl=80:20; pH=2, $Cl_2$:HOCl=30:70; pH=3, $Cl_2$:HOCl=10:90).

Thus, in order to increase efficiency of the generation of sodium hypochlorite, the current efficiency for chlorine is needed to be increased and the pH of the anode is needed to be reduced as much as possible.

In addition, in the case of sodium hypochlorite produced by the gas-liquid reaction, the reaction is done by the stoichiometric ratio Cl 2: NaOH=1:2, as shown in the above gas-liquid reaction expression. However, if there is insufficient amount of caustic soda (NaOH), a by-product hypochlorite ($ClO_3-$) is formed by the reoxidation reaction. Therefore, in order to reduce the occurrence of these by-products, stoichiometric material balance must be matched, so caustic soda (NaOH) is required to be re-injected.

As such, the existing process has the disadvantage of the risk of chemical handling and high cost because of the required additional injection of hydrochloric acid (HCl) and caustic soda (NaOH) to balance the material in the gas-liquid reaction and to increase the chlorine generation efficiency of the anode.

SUMMARY OF INVENTION

Technical Problem

The present invention is aimed to provide high efficiency sodium hypochlorite generator for decreasing by-product to minimize the generation of the by-product hypochlorite ($ClO_3-$) by increasing the chlorine generation efficiency of the anode and matching the material balance during the gas-liquid contact, in a sodium hypochlorite generator producing sodium hypochlorite by a diaphragm electrolyzer.

The purpose of the present invention is to provide a highly safe, economical and efficient sodium hypochlorite generator for decreasing by-product, by supplying chemicals produced by using salt to a diaphragm-type sodium hypochlorite generator Solution to Problem In order to solve the above-mentioned problems, the present invention is aimed to provide a high efficiency sodium hypochlorite generator for decreasing by-product characterized by an additional water-splitting electrodialysis tank producing hydrochloric acid and caustic soda using sodium chloride aqueous solution and water and supplying them as the anode water and cathode water respectively, in addition to a sodium hypochlorite generator comprised of a diaphragm-type electrolyzer comprised of a anode chamber which an aqueous solution of sodium chloride flows into, an cathode chamber where the water is entering, and a cation exchange membrane dividing the anode chamber and the cathode chamber; an anode water storage tank containing the anode water and chlorine gas produced by the electrolytic reaction in the anode chamber; a cathode water storage tank containing the caustic soda produced by the electrolytic reaction in the cathode chamber and discharging hydrogen gas; and a gas-liquid contact area where the chlorine gas supplying from the anode water storage tank and the caustic soda produced from the cathode water storage tank react in order to produce sodium hypochlorite.

The high efficiency sodium hypochlorite generator for decreasing by-product of the present invention is characterized by an additional hydrochloric acid storage tank that stores the hydrochloric acid supplied from the water-splitting electrodialysis tank and supplies it as the anode water and a caustic soda storage tank that stores caustic soda supplied from the water-splitting electrodialysis tank and supplies it as cathode water.

In the present invention, the water-splitting electrodialysis tank is an electrolyzer comprised of an anion exchange membrane, a cation exchange membrane, an amphoteric ion membrane, an anion exchange membrane, and a cation exchange membrane, in order from the surface facing the anode between the anode and cathode; and is characterized by the amphoteric ion membrane having anion-exchange functional group at one end facing the cation exchange membrane, and having cation-exchange functional group at the other end facing the anion exchange membrane.

Here the present invention is characterized by comprising of a desalination chamber placed between the anion exchange membrane and cation exchange membrane, a base generation chamber placed between the cation exchange membrane and anion-exchange functional group, and an acid generation chamber formed between the anion exchange membrane and cation-exchange functional group; and is characterized by the water, which has entered the amphoteric ion membrane, is separated into hydroxide ion and hydrogen ion by the electrolysis, and is discharged through the anion-exchange functional group and cation-exchange functional group respectively.

In addition, it is characterized by the fact that, if the sodium chloride aqueous solution is supplied to the desalination chamber, water is supplied to the acid generation chamber and base generation chamber, and current is supplied to the electrode of the water-splitting electrodialysis tank, the sodium ions out of the sodium chloride aqueous solution that was supplied to the desalination chamber move to the base generation chamber via the cation exchange membrane to meet hydroxide ions, which were discharged through the anion-exchange functional group, and produce caustic soda; chlorine ions out of the sodium chloride aqueous solution, which was supplied to the desalination chamber, move to the acid generation chamber via the anion exchange membrane to meet hydrogen ions that were discharged through the cation-exchange functional group and produce hydrochloric acid.

The present invention is characterized by the fact that the supply line of the sodium chloride aqueous solution to the desalination chamber is the branch line of the supply line of sodium chloride aqueous solution to the anode water storage tank; and that the water supply line to the acid generation chamber and base generation chamber is the branch line of the water supply line to the cathode water storage tank.

Industrial Applicability

The present invention can provide a high efficiency sodium hypochlorite generator for decreasing by-product that can minimize the by-product hypochlorite ($ClO_3-$) by improving the chlorine generation efficiency of the anode and by matching the material balance during the gas-liquid contact, in sodium hypochlorite generators producing sodium hypochlorite by diaphragm electrolyzer.

In addition, the present invention can provide a highly safe, economical and efficient sodium hypochlorite generator for decreasing by-product, without using chemicals that are difficult to handle and expensive because it can supply the generated chemicals to the diaphragm-type sodium hypochlorite generator by using only salt.

DETAILED DESCRIPTION OF THE PREFERRED EMBODIMENT

Hereinafter, the present invention is described in detail in accordance with the attached drawings and preferred embodiments.

Figure 1:
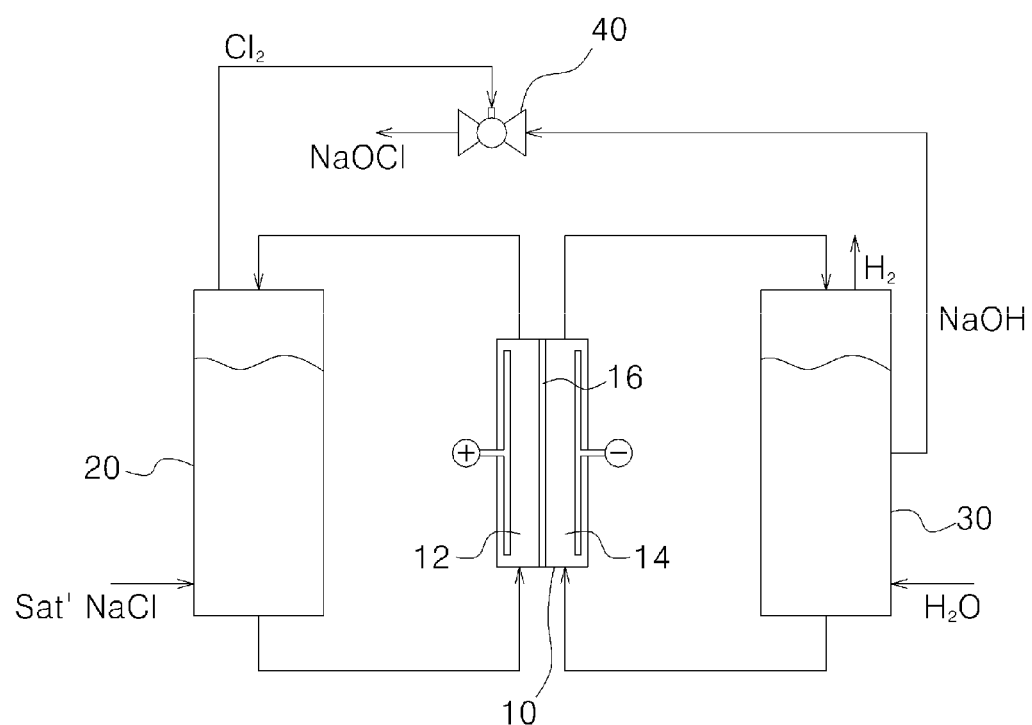
FIG. 1 shows the diaphragm electrolyzer of a conventional sodium hypochlorite generator.
Figure 2:
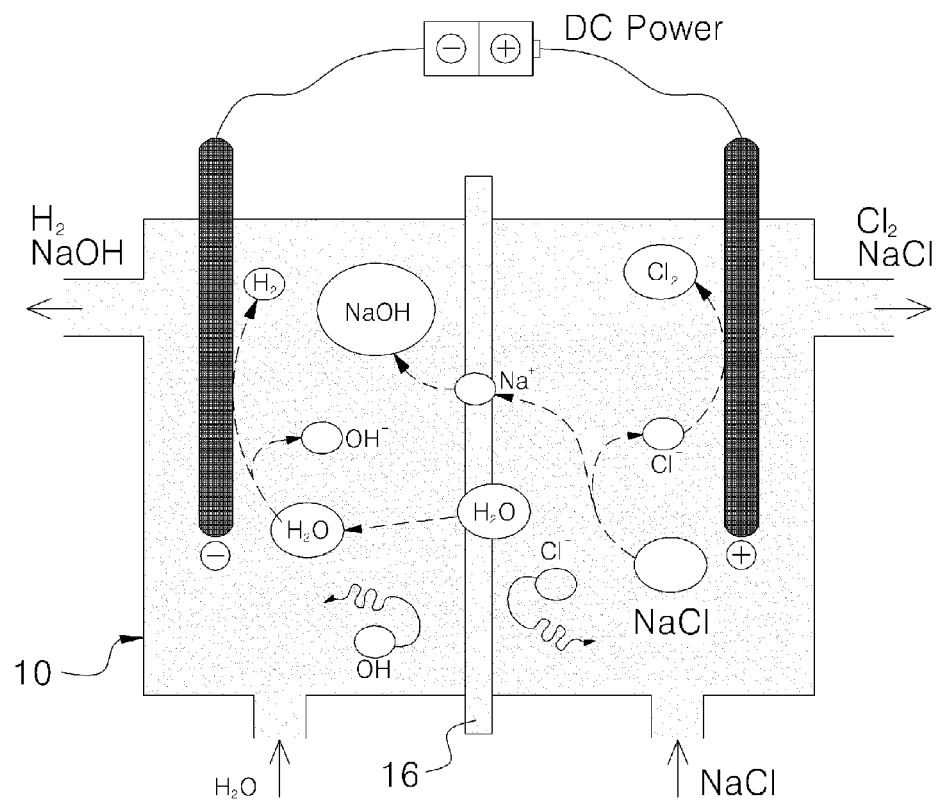
FIG. 2 illustrates the electrolytic reaction occurring in the diaphragm electrolyzer of a conventional sodium hypochlorite generator.
Figure 3:
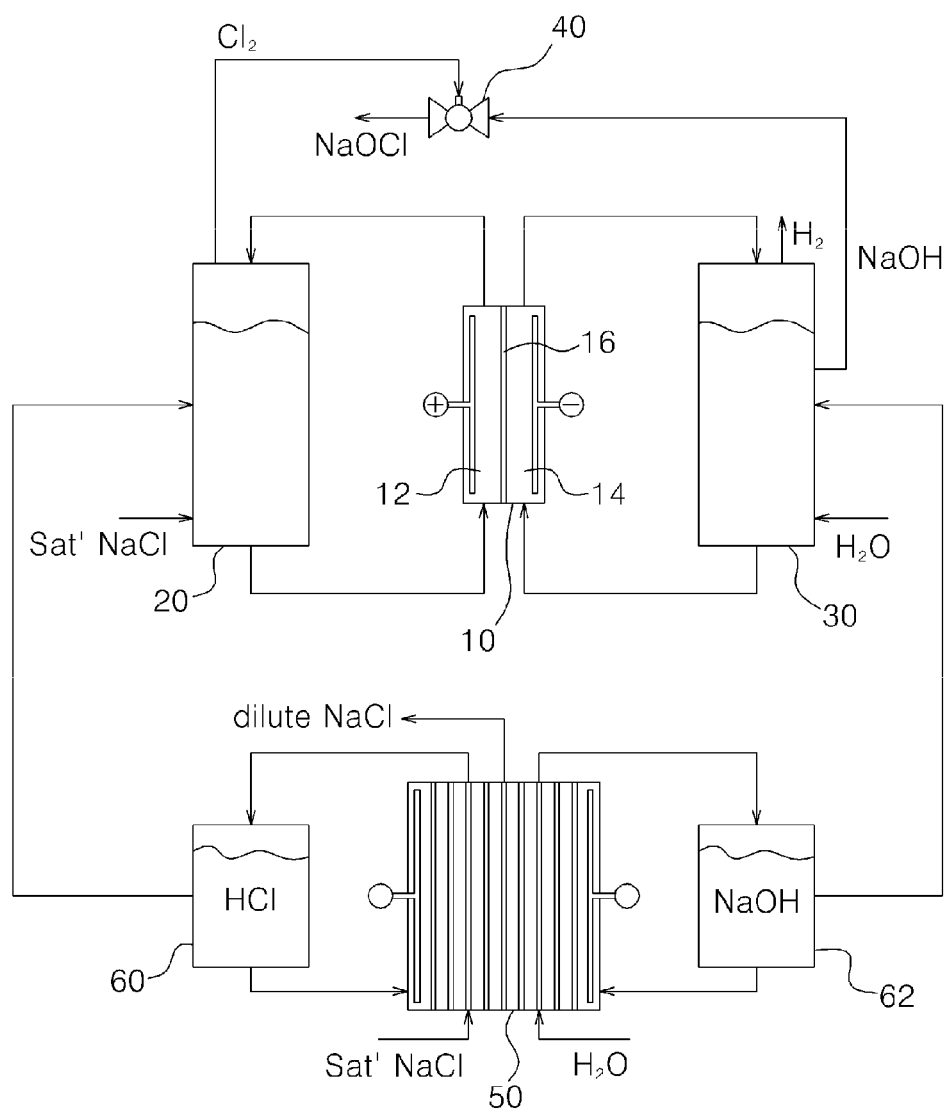
FIG. 3 shows the improved diaphragm electrolyzer of the high efficiency sodium hypochlorite generator for decreasing by-product of the present invention.
Figure 4:
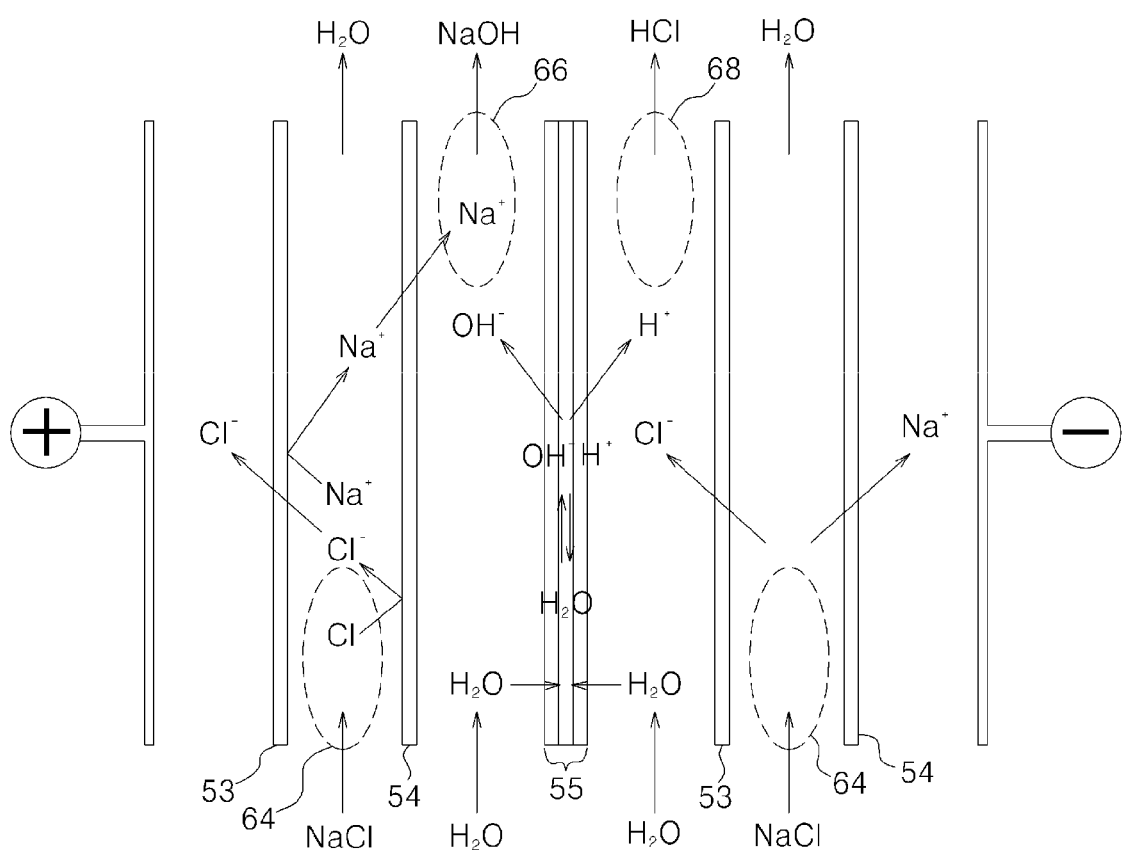
FIG. 4 shows the water-splitting electrodialysis tank of the high efficiency sodium hypochlorite generator for decreasing by-product of the present invention.

FIG. 3 shows the improved diaphragm electrolyzer 10 of the high efficiency sodium hypochlorite generator for decreasing by-product of the present invention, and FIG. 4 shows the water-splitting electrodialysis tank 50 of the high efficiency sodium hypochlorite generator for decreasing by-product of the present invention.

As shown in FIG. 3, the high efficiency sodium hypochlorite generator for decreasing by-product of the present invention is characterized by an additional water-splitting electrodialysis tank 50 producing hydrochloric acid and caustic soda using sodium chloride aqueous solution and water and supplying them as the anode water and cathode water respectively, in addition to a sodium hypochlorite generator comprised of a diaphragm-type electrolyzer 10 comprised of an anode chamber 12 which an aqueous solution of sodium chloride flows into, an cathode chamber 14 where the water is entering, and a cation exchange membrane 16 dividing the anode chamber 12 and the cathode chamber 14; an anode water storage tank 20 containing the anode water and chlorine gas produced by the electrolytic reaction in the anode chamber 12; a cathode water storage tank 30 containing the caustic soda produced by the electrolytic reaction in the cathode chamber 14 and discharging hydrogen gas; and a gas-liquid contact area 40 where the chlorine gas supplying from the anode water storage tank 20 and the caustic soda produced from the cathode water storage tank 30 react in order to produce sodium hypochlorite.

In the sodium hypochlorite generator, the sodium chloride aqueous solution flowing into the anode chamber 12 is a saturated aqueous solution of sodium chloride, and the water flowing into the cathode chamber 14 is pre-treated pure water.

At this time, the hydrochloric acid is supplied to the anode water storage tank 20 and circulated in the anode chamber 12, or discharged from the anode water storage tank 20 and supplied to a separate tank containing anode water and transferred to the gas-liquid contact area 40 after evaporating the residual chlorine in the anode water. And caustic soda can be supplied by separately installed line or the tank.

The present invention uses saturated sodium chloride aqueous solution that is used in existing diaphragm-type of sodium hypochlorite generator: it uses the method that generates hydrochloric acid (HCl) and caustic soda (NaOH) in the water-splitting electrodialysis tank 50 and inject anode water and cathode water as required respectively in order to adjust the material balance.

In addition, the high efficiency sodium hypochlorite generator for decreasing by-product of the present invention may additionally include a hydrochloric acid storage tank 60 that stores hydrochloric acid supplied from the water-splitting electrodialysis tank 50 and supplies it as anode water; and a caustic soda storage tank 62 that stores caustic soda supplied from the water-splitting electrodialysis tank 50 to supply it as cathode water.

Meanwhile, the water-splitting electrodialysis tank 50 is an electrolyzer comprised of an anion exchange membrane 53, a cation exchange membrane 54, an amphoteric ion membrane 55, an anion exchange membrane 53, and a cation exchange membrane 54, in order from the surface facing the anode between the anode and cathode as shown in FIG. 4; and is characterized by that the amphoteric ion membrane 55 has the anion-exchange functional group 56 at one end facing the cation exchange membrane 54 and cation-exchange functional group 57 at the other end facing the anion exchange membrane 53.

In addition, the water-splitting electrodialysis tank 50 contains a compartment which comprises of the desalination chamber 64 placed between the anion exchange membrane 53 and cation exchange membrane 54 respectively; the base generation chamber 66 placed between the cation exchange membrane 54 and anion-exchange functional group 56; and the acid generation chamber 68 that is formed between the anion exchange membrane 53 and cation-exchange functional group 57.

The principle of the acid and base generation by the water-splitting electrodialysis tank 50 is as follows.

First, the saturated sodium chloride aqueous solution is to be flowed into the desalination chamber 64 between the cation exchange membrane 54 and the anion exchange membrane 53 of the water-splitting electrodialysis tank 50, followed by the inflow of the pre-treated pure water into the acid generation chamber 68 and base generation chamber 66.

The saturated sodium chloride aqueous solution that was introduced to the desalination chamber 64 is desalinated and diluted in the desalination chamber 64 when DC power is supplied, by the ion mobility in the water-splitting electrodialysis tank 50, and the diluted sodium chloride aqueous solution is injected into the salt tank again of the diaphragm-type sodium hypochlorite generator.

In this case, the amphoteric ion membrane 55 exists in wet state containing the water; the water in the amphoteric ion membrane 55 is separated into hydrogen ion (H+) and hydroxide ion (OH−) by the electrolysis when DC power is supplied to anode and cathode respectively. The separated water molecules discharge anion hydroxide ion (OH−) on the surface having anion-exchange functional group 56 facing the anode; and cation hydrogen ion (H+) on the surface having cation-exchange functional group 57 facing the cathode.

In addition, from the sodium chloride aqueous solution of the desalination chamber 64, the sodium ions (Na+) move to the base generation chamber 66 via cation exchange membrane 54; the chlorine ions (Cl−) move to the acid generation chamber 68 via anion exchange membrane 53.

And the hydroxide ions (OH−) are discharged to the base generation chamber 66 by the reaction on the surface having anion-exchange functional group 56 of the amphoteric ion membrane 55 adjacent to the cation exchange membrane 54 meet the sodium ions (Na+) passed through the cation exchange membrane 54 to produce base caustic soda (NaOH), which moves to caustic soda storage tank 62.

Likewise, the hydrogen ions (H+) are discharged to the acid generation chamber 68 by the reaction on the surface having cation-exchange functional group 57 of the amphoteric ion membrane 55 adjacent to the anion exchange membrane 53 meet the chlorine ions (Cl−) passed through the anion exchange membrane 53 to produce acid, hydrochloric acid (HCl), which moves to hydrochloric acid storage tank 60.

The generated liquids—caustic soda and hydrochloric acid—introduced to the caustic soda storage tank 62 and hydrochloric acid storage tank 60 circulate the base generation chamber 66 and acid generation chamber 68 respectively until they reach to certain concentration; the pure water introduced to the base generation chamber 66 and acid generation chamber 68 is injected to the caustic soda storage tank 62 and hydrochloric acid storage tank 60 respectively until it reached to a certain level, when it stops injection. When the caustic soda and hydrochloric acid with the concentration set forth are finally generated, DC power supply to the electrode of the water-splitting electrodialysis tank 50 is stopped; the injection of the saturated sodium chloride aqueous solution is stopped; and the circulation supply of the caustic soda storage tank 62 and hydrochloric acid storage tank 60 is also stopped.

Thus generated hydrochloric acid (HCl) and caustic soda (NaOH) are used as intermittently added chemicals into the anode water storage tank 20 and cathode water storage tank 30 respectively, according to the sensor values installed in each storage tank to maintain constant pH and concentration, in order to minimize the generation of the by-product hypochlorite ($ClO_3-$) by increasing the chlorine gas ($Cl_2$) generation efficiency of the anode and regulating the material balance in the gas-liquid reaction.

And when the level of the hydrochloric acid storage tank 60 and caustic soda storage tank 62 falls down to a certain degree during the injection of the hydrochloric acid and caustic soda, the process is repeated to regenerate and store the hydrochloric acid and caustic soda.

The present invention is characterized by the fact that the supply line of the saturated sodium chloride aqueous solution to the desalination chamber 64 is the branch line of the supply line of saturated sodium chloride aqueous solution to the anode water storage tank 20; and that the water supply line to the acid generation chamber 68 and base generation chamber 66 is the branch line of the water supply line to the cathode water storage tank 30.

In other words, the present invention can connect the saturated sodium chloride aqueous solution line introducing from the diaphragm-type sodium hypochlorite generator to the anode water storage tank 20 and the inlet line of the desalination chamber 64 of the water-splitting electrodialysis tank 50 with the branch line; and can equip the inlet line of the water supply to the acid generation chamber 68 and base generation chamber 66 of the water-splitting electrodialysis tank 50 with the branch line of the pure water line introducing to the cathode water storage tank 30 of the diaphragm-type sodium hypochlorite generator.

In this case, it can be constructed for the inlet line of the base generation chamber 66 to be connected to the circulation line of the caustic soda storage tank 62; the inlet line of the acid generation chamber 68 to be connected to the circulation line of the hydrochloric acid storage tank 60; the discharge line of the desalination chamber 64 of the water-splitting electrodialysis tank 50 to be connected to the salt tank of the sodium hypochlorite generator of the desalination chamber 64.

In addition, it can be constructed the way for the discharge line of the base generation chamber 66 to be connected to the caustic soda storage tank 62 and circulate the caustic soda generated liquid; for the discharge line of the acid generation chamber 68 be connected to the hydrochloric acid storage tank 60 to circulate the generated hydrochloric acid.

Thus created hydrochloric acid and caustic soda with constant concentration are stored in the hydrochloric acid storage tank 60 and caustic soda storage tank 62 respectively and supplied as require to the anode water and cathode water of the diaphragm-type sodium hypochlorite generator.

REFERENCE NUMERALS

- 10: diaphragm electrolyzer
- 12: anode chamber
- 14: cathode chamber
- 16: cation exchange membrane
- 20: anode water storage tank
- 30: cathode water storage tank
- 40: gas-liquid contact area
- 50: water-splitting electrodialysis tank
- 53: anion exchange membrane
- 54: cation exchange membrane
- 55: amphoteric ion membrane
- 56: anion-exchange functional group
- 57: cation-exchange functional group
- 60: hydrochloric acid storage tank
- 62: caustic soda storage tank
- 64: desalination chamber
- 66: base generation chamber
- 68: acid generation chamber

What is claimed is:

1. A sodium hypochlorite generator for decreasing by-product comprising:
    a water-splitting electrodialysis tank that generates hydrochloric acid and caustic soda using sodium chlorite aqueous solution and water, and supplies them as anode water and cathode water respectively;
    a diaphragm electrolyzer equipped with an anode chamber into which the sodium chloride aqueous solution is introduced, a cathode chamber into which the water is introduced, and a first cation exchange membrane partitioning the anode chamber and the cathode chamber;
    an anode water storage tank for storing the anode water and chlorine gas generated by an electrolytic reaction of the anode chamber;
    a cathode water storage tank for storing the caustic soda and discharging hydrogen gas generated by the electrolytic reaction of the cathode chamber; and
    a gas-liquid contact area where the caustic soda that is stored in the cathode water storage tank and the chlorine gas that is supplied from the anode water storage tank react in order to generate sodium hypochlorite,
    wherein the water-splitting electrodialysis tank comprises a first anion exchange membrane, a second cation exchange membrane, an amphoteric ion membrane, a second anion exchange membrane, and a third cation exchange membrane, disposed in order from a surface facing an anode between the anode and a cathode,
    the amphoteric ion membrane having an anion-exchange functional group at one end facing the second cation exchange membrane and a cation-exchange functional group at another end facing the second anion exchange membrane.

2. The sodium hypochlorite generator for decreasing by-product of claim 1, further comprising a hydrochloric acid storage tank for storing the hydrochloric acid from the water-splitting electrodialysis tank and supplying it as the anode water; and a caustic soda storage tank for storing the caustic soda from the water-splitting electrodialysis tank and supplying it as the cathode water.

3. The sodium hypochlorite generator for decreasing by-product of claim 1, further comprising:
    a first desalination chamber placed between the first anion exchange membrane and the second cation exchange membrane;
    a second desalination chamber placed between the second anion exchange membrane and the third cation exchange membrane;
    a base generation chamber placed between the second cation exchange membrane and the anion-exchange functional group; and
    an acid generation chamber placed between the second anion exchange membrane and the cation-exchange functional group.

4. The sodium hypochlorite generator for decreasing by-product of claim 3, wherein
    the water introduced to the amphoteric ion membrane is separated by electrolysis into hydroxide ions and hydrogen ions, which are discharged through the anion-exchange functional group and the cation-exchange functional group, respectively.

5. The sodium hypochlorite generator for decreasing by-product of claim 4, wherein
    when the sodium chloride aqueous solution is supplied to the first and second desalination chambers, water is supplied to the acid generation chamber and the base generation chamber, and current is supplied to the electrodes of the water-splitting electrodialysis tank, sodium ions among the sodium chloride aqueous solution supplied to the first desalination chamber move to the base generation chamber via the second cation exchange membrane to meet the hydroxide ions discharged through the anion-exchange functional group in order to generate the caustic soda; and chlorine ions among the sodium chloride aqueous solution supplied to the second desalination chamber move to the acid generation chamber via the second anion exchange membrane to meet the hydrogen ions discharged through the cation-exchange functional group in order to generate the hydrochloric acid.

6. The sodium hypochlorite generator for decreasing by-product of claim 3, wherein
    a first supply line of the sodium chloride aqueous solution to the first and second desalination chambers is a branch line of a second supply line of the sodium chloride aqueous solution to the anode water storage tank.

7. The sodium hypochlorite generator for decreasing by-product of claim 3, wherein
    a third supply line of the water to the acid generation chamber and the base generation chamber is a branch line of a fourth supply line of the water to the cathode water storage tank.

* * * * *